US009415427B2

(12) United States Patent
Nilsson

(10) Patent No.: US 9,415,427 B2
(45) Date of Patent: Aug. 16, 2016

(54) MACHINE FOR WORKING A SURFACE WITH A HIGH-PRESSURE WATER JET

(71) Applicant: CONJET AB, Haninge (SE)

(72) Inventor: Lars Goran Nilsson, Vendelso (SE)

(73) Assignee: Conjet AB, Haninge (SE)

( * ) Notice: Subject to any disclaimer, the term of this patent is extended or adjusted under 35 U.S.C. 154(b) by 0 days.

(21) Appl. No.: 14/762,329

(22) PCT Filed: Jan. 5, 2014

(86) PCT No.: PCT/SE2014/050005
§ 371 (c)(1),
(2) Date: Jul. 21, 2015

(87) PCT Pub. No.: WO2014/123468
PCT Pub. Date: Aug. 14, 2014

(65) Prior Publication Data

US 2015/0352603 A1 Dec. 10, 2015

(30) Foreign Application Priority Data

Feb. 5, 2013 (SE) ....................................... 1300085

(51) Int. Cl.

| | |
|---|---|
| ***A01G 25/09*** | (2006.01) |
| ***B08B 3/02*** | (2006.01) |
| ***E01C 23/12*** | (2006.01) |
| ***E01D 22/00*** | (2006.01) |
| ***B28D 1/00*** | (2006.01) |

(52) U.S. Cl.
CPC . *B08B 3/024* (2013.01); *B28D 1/00* (2013.01); *E01C 23/128* (2013.01); *E01D 22/00* (2013.01)

(58) Field of Classification Search
CPC ........ B05B 3/024; B05B 3/06; B05B 13/005; B05B 12/002; F02D 29/04; F02D 9/02
USPC .......................................... 239/146, 172, 149
See application file for complete search history.

(56) References Cited

U.S. PATENT DOCUMENTS

| | | | | |
|---|---|---|---|---|
| 2007/0125878 A1* | 6/2007 | Hahn | B08B 3/026 | 239/332 |
| 2009/0266923 A1* | 10/2009 | Gardner | B05B 1/02 | 239/601 |
| 2012/0187218 A1* | 7/2012 | Kim | F02D 19/105 | 239/417.5 |
| 2014/0121881 A1* | 5/2014 | Diazdelcastillo | A01D 42/00 | 701/23 |

FOREIGN PATENT DOCUMENTS

| | | |
|---|---|---|
| WO | WO 99/43605 | 9/1999 |
| WO | WO 02/31265 | 4/2002 |
| WO | WO 02/081823 | 10/2002 |
| WO | WO 2005/090684 | 9/2005 |

* cited by examiner

*Primary Examiner* — Davis Hwu
(74) *Attorney, Agent, or Firm* — Mark P. Stone

(57) ABSTRACT

A machine for working a surface with a high-pressure water jet, comprising a mobile chassis (11) with a boom (14) that carries a lance (22) with a nozzle (23) for spraying water, and a drive unit (35) that comprises a motor and control units for the chassis and the boom. The chassis (11) comprises an underframe (33) and a carrier unit (34) shiftably mounted on the underframe, which carrier unit carries the boom (14) and the drive unit (35) so that the machine's center of gravity can be shifted by shifting the carrier on the underframe.

1 Claim, 6 Drawing Sheets

MACHINE FOR WORKING A SURFACE WITH A HIGH-PRESSURE WATER JET

AREA OF THE INVENTION

This invention relates to a machine for working a surface with a high-pressure water jet, comprising a mobile chassis with a boom that carries a lance with a water jet ejecting nozzle, and a drive unit that comprises a motor and control units for the chassis and the boom.

BACKGROUND OF THE INVENTION

A machine of this type is known from, for example, SE 525915 and is used for working a surface layer of concrete, especially the surface layer on concrete is bridges so that a new surface layer can be poured. The surface layer gradually acquires cracks and the surface layer must be renewed before salt from the winter salting reaches down to the uppermost reinforcing layer. The machine can also be used for vertical surfaces.

GOAL OF THE INVENTION

The invention has the purpose of creating greater safety also when using it on vertical surfaces and roof surfaces with a machine adapted chiefly for horizontal surfaces.

SHORT DESCRIPTION OF THE INVENTION

The purpose of the invention is met when the chassis comprises an underframe and a carrier unit shiftably mounted on the underframe, which carrier unit carries the boom and the drive unit so that the machine's centre of gravity can be shifted by shifting the carrier on the underframe. The invention is defined by the claims.

SHORT DESCRIPTION OF THE DRAWINGS

DESCRIPTION OF THE SHOWN EXAMPLE OF THE INVENTION

Figure 1:
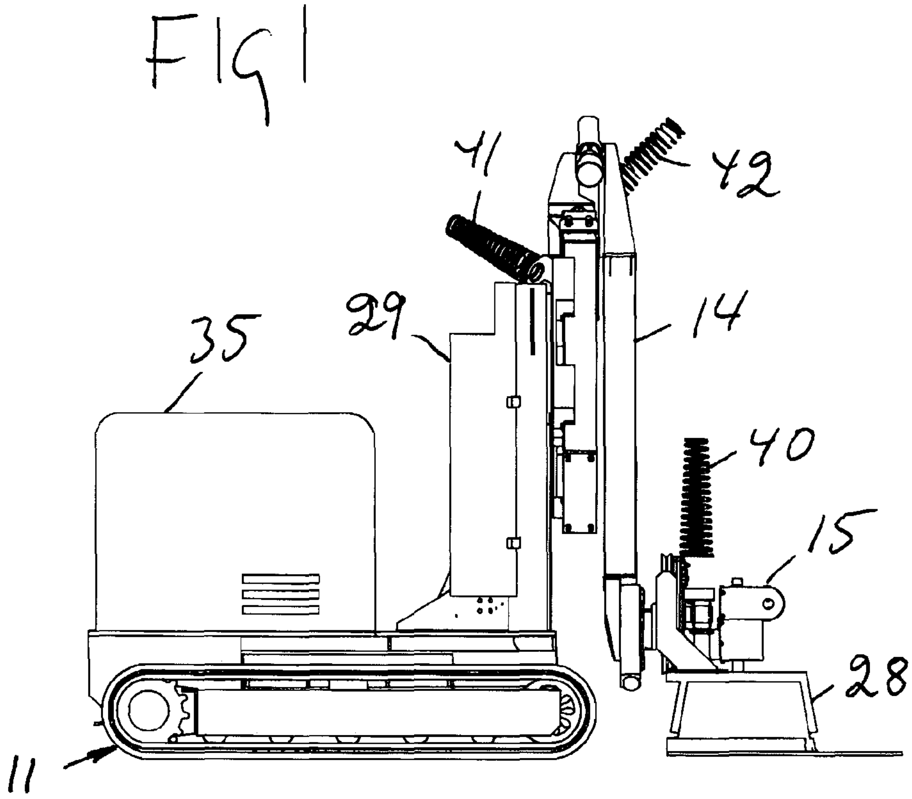
FIG. 1 is a lateral view of an example of a machine in accordance with the invention.

The machine shown in the figures has a mobile chassis 11 with caterpillar tracks 12, 13. The chassis carries a boom 14 that carries in a universally flexible manner a working unit 15 of the type shown and described in SE525915 and therefore not described and shown in detail here. The working unit comprises a feeding beam 16 and a traveling cart 20 mounted on the latter.

Figure 6:
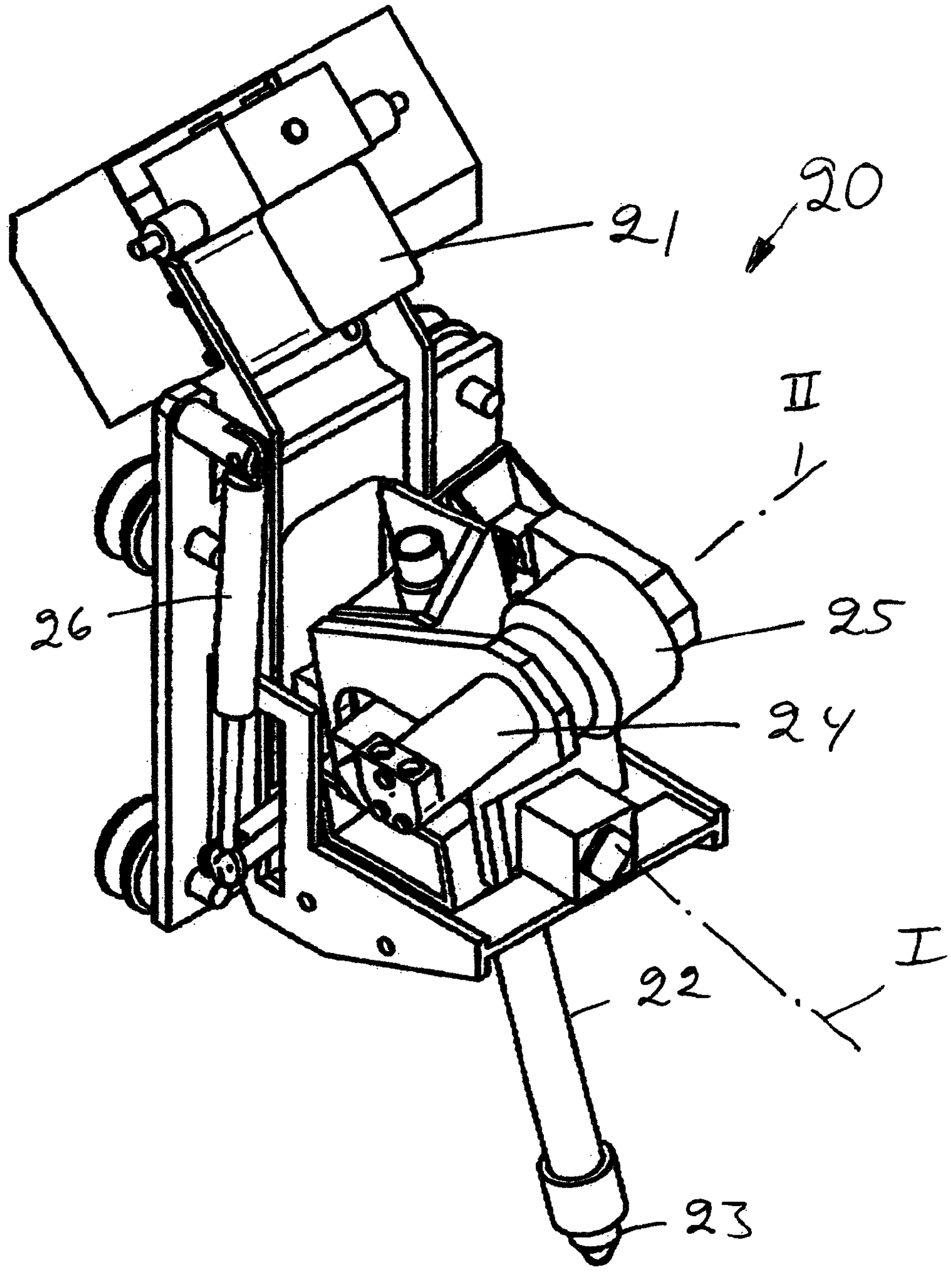
FIG. 6 is a perspective view of a traveling cart carrying a nozzle for ejecting a water jet.

The traveling cart 20 and the feeding beam 16 are shown separately as FIG. 6. The traveling cart 20 has a hydraulic motor 21 that drives the carriage out along the feeding beam with a cogwheel engaged with a rack on the feeding beam. The traveling cart carries a lance 22 that comprises a nozzle 23 for ejecting a water jet and is coupled to an external pump for high-pressure water for producing a collected, laminar, working water jet with supersonic speed. A hydraulic motor 24 is constructed together with a bearing housing 25 for oscillating the lance 22 by a crankshaft about an axis II in a plane at a right angle to the direction of movement of the traveling cart in order to produce a wider working track. A hydraulic motor in the form of a hydraulic cylinder 26 (a pivoting device 26) is coupled to pivot the lance 22 together with the motor 24 and the bearing housing 25 about an axis I that is at a right angle to the traveling cart, that is, to pivot the lance in a plane parallel to the feeding beam in order to be able to give the lance an angle of attack. The lance extends down into a protective hood 28 (FIG. 1) that holds broken-off concrete and water within the housing.

The chassis 11 has an upright console 29 with a rotatable holder for the boom 14 so that the boom can be rotated in a plane across the chassis. The inner part 30 of the boom has an extensible part 31 and the boom has an outer part 32 that is rotatably fastened in the inner part of the boom and carries the working unit 15. The hoses for connecting high-pressure water and hydraulic oil are not shown but a steel spiral 40 for protecting the water connection and steel spirals 41, 42 for protecting the hydraulic hose connections are shown.

The chassis 11 has an underframe 33 with caterpillar tracks 12, 13 and an upper part, a carrier unit 34 that carries the console 29 and a drive unit 35 that comprises a motor and control units for the chassis and the boom. The upper part 34 of the chassis runs in longitudinal guide rails 36, 37 on the underframe 33, which can be best seen from FIG. 3, and the upper part can be shifted by a motor on the lower part by a hydraulic cylinder 38 coupled between the upper part and the underframe, as is apparent from FIG. 4. FIG. 4 shows the position in FIG. 1 and it is a detailed image from FIG. 1 in partial longitudinal section for showing the hydraulic cylinder 38.

FIG. 1 shows the machine in position for working a horizontal surface, for example, a bridge deck. In this position the machine is not balanced in the longitudinal direction with respect to the caterpillar tracks but rather its centre of gravity is located closer to the console 29 so that the machine becomes balanced in operation since the force of the reaction from the water jet then creates a significant lifting force on the boom.

Figure 2:
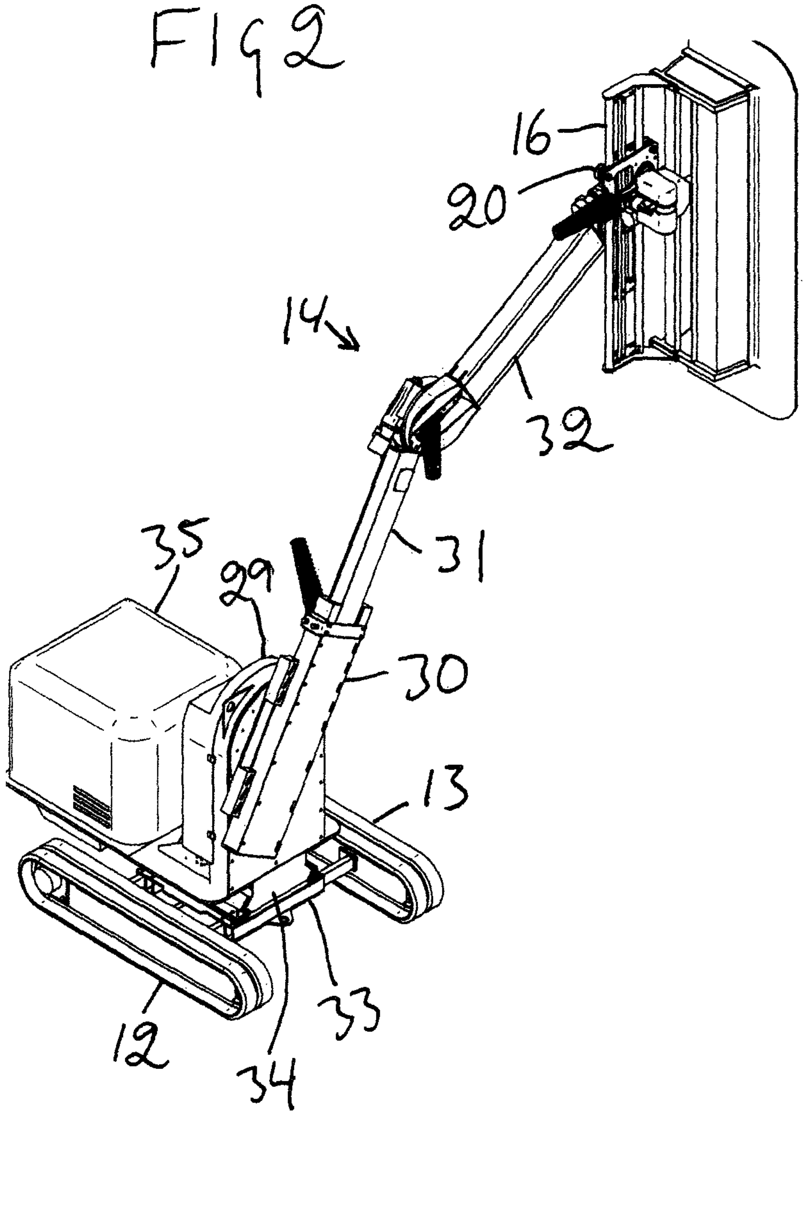
FIG. 2 is a perspective view of the same machine in another work position.
Figure 3:
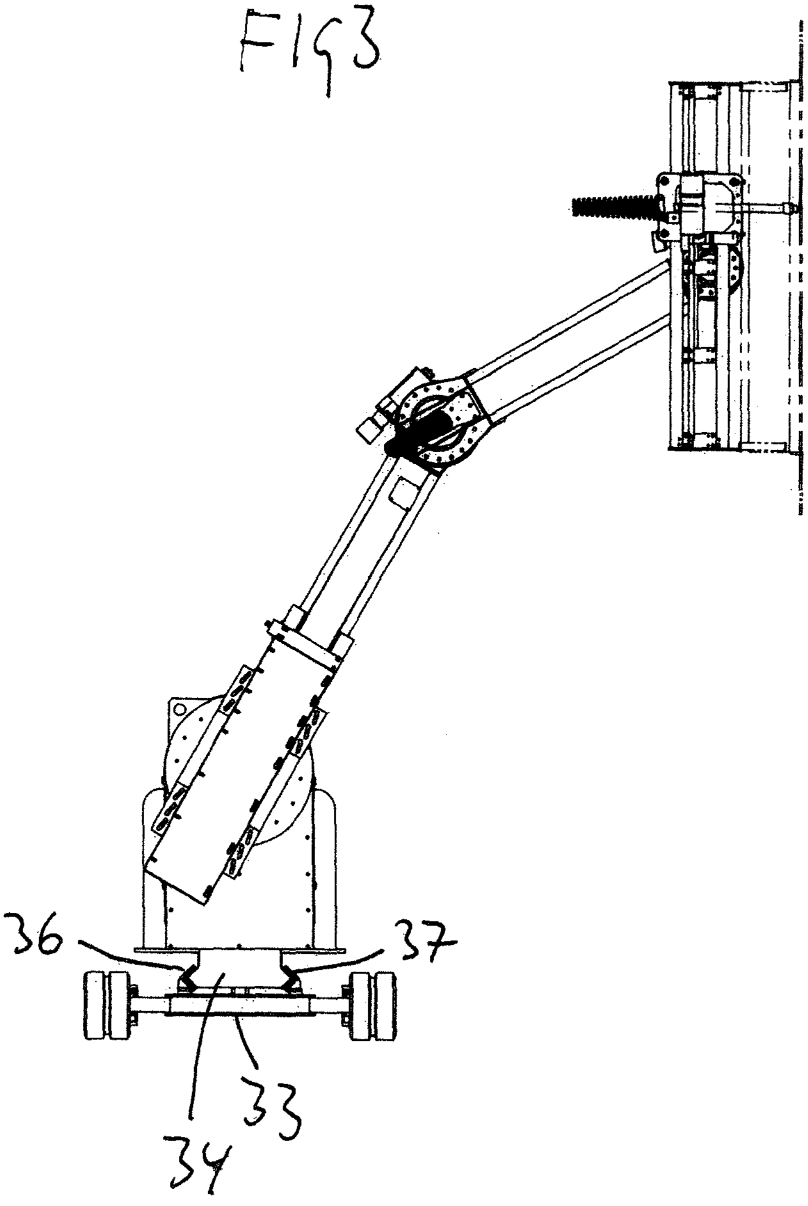
FIG. 3 is a front view corresponding to FIG. 2.
Figure 4:
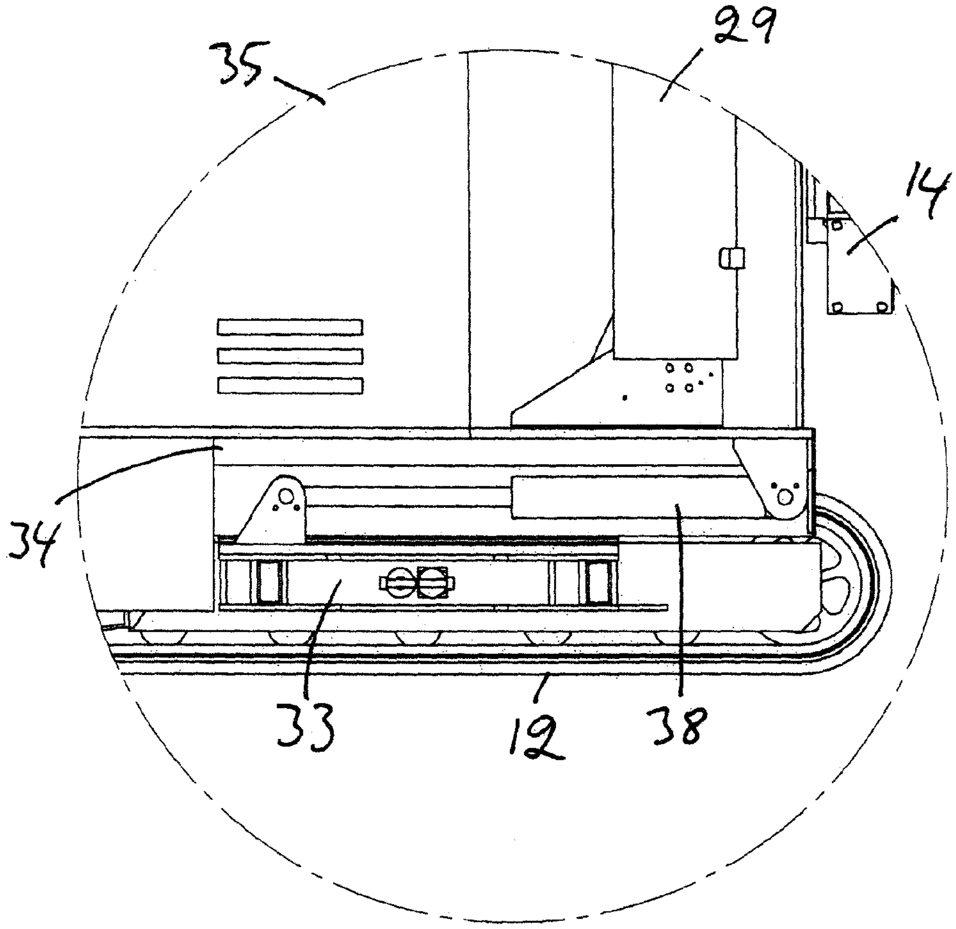
FIG. 4 is a partially open detailed view of FIG. 1.
Figure 5:
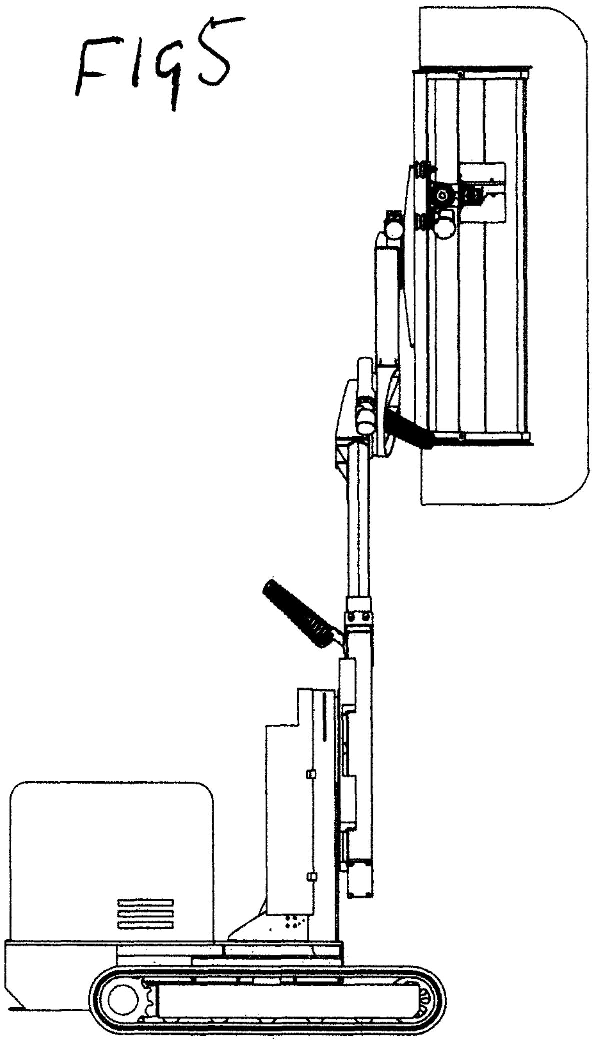
FIG. 5 is a lateral view in the work position shown in FIG. 2.

FIGS. 2, 3 and 5 show the machine in position for working a vertical surface. In this case the hydraulic cylinder 38 is instead contracted so that the upper part 34 of the chassis becomes shifted on the underframe 33, as is shown in the figures. As a result thereof, the machine becomes more balanced in the longitudinal direction when vertical surfaces or, e.g., roof surfaces in a tunnel are to be worked so that the machine becomes stable even for these job tasks. This brings it about that the risk of the machine overturning is reduced.

The invention claimed is:

1. A machine for working a surface with a high-pressure water jet, said machine comprising a mobile chassis (11) with a boom (14) that carries a lance (22) with a nozzle (23) for ejecting a water jet, and a drive unit (35) that comprises a motor and control units for the chassis and the boom, wherein:

the chassis (11) comprises an underframe (33) and a carrier unit (34) shiftably mounted on the underframe, which carrier unit carries the boom (14) and the drive unit (35) so that the machine's center of gravity can be shifted by shifting the carrier on the underframe.

* * * * *